US008333515B2

(12) United States Patent
Milliken et al.

(10) Patent No.: US 8,333,515 B2
(45) Date of Patent: Dec. 18, 2012

(54) EXTERNAL BEARING SHROUD

(75) Inventors: Collin B. Milliken, Valparaiso, IN (US);
John P. Cook, Bath, PA (US)

(73) Assignee: Emerson Power Transmission Corporation, Florence, KY (US)

( * ) Notice: Subject to any disclaimer, the term of this patent is extended or adjusted under 35 U.S.C. 154(b) by 380 days.

(21) Appl. No.: 12/617,977

(22) Filed: Nov. 13, 2009

(65) Prior Publication Data
US 2010/0054645 A1 Mar. 4, 2010

Related U.S. Application Data

(63) Continuation-in-part of application No. 11/480,212, filed on Jun. 30, 2006, now Pat. No. 7,637,665.

(51) Int. Cl.
*F16C 33/76* (2006.01)
*F16C 43/00* (2006.01)
*F16C 23/08* (2006.01)

(52) U.S. Cl. ......... 384/477; 384/484; 384/537; 384/558

(58) Field of Classification Search .......... 384/477, 384/478, 481, 482, 483, 484, 485, 486, 537, 384/559, 558; 277/351, 353, 422, 433, 551, 277/568, 571, 572, 576, 577
See application file for complete search history.

(56) References Cited

U.S. PATENT DOCUMENTS

| | | | |
|---|---|---|---|
| 2,405,122 A | 8/1946 | Firth | |
| 2,856,208 A | 10/1958 | Cobb | |
| 3,526,409 A * | 9/1970 | Heinlein | 277/411 |
| 4,113,328 A | 9/1978 | Meulen | |
| 4,484,752 A | 11/1984 | Bentley | |
| 4,537,519 A | 8/1985 | LaRou et al. | |
| 4,669,895 A | 6/1987 | Colanzi et al. | |
| 4,728,202 A | 3/1988 | LaRou | |
| 4,792,242 A | 12/1988 | Colanzi et al. | |
| 4,799,808 A | 1/1989 | Otto | |

(Continued)

FOREIGN PATENT DOCUMENTS

JP 2007-127157 2/2007

OTHER PUBLICATIONS

First Office Action dated May 7, 2010 from corresponding Chinese Patent Application No. 200780030138.4 (English translation, 13 pages).

(Continued)

*Primary Examiner* — Phillip A Johnson
(74) *Attorney, Agent, or Firm* — Harness, Dickey & Pierce, P.L.C.

(57) ABSTRACT

A bearing assembly includes an inner race adapted to be coupled to an inner member and an outer race adapted to be coupled to an outer member positioned such that the inner race is in an opposed and spaced apart relation from the outer race. Roller elements are disposed between the inner and outer races. An inner flange is coupled to the outer race, includes circumferentially spaced apart recesses and extends generally radially toward the inner race. An outer flange is coupled to the inner race. A flexible sealing member contacts both the inner flange and the outer flange. A shroud includes tabs that extend through the recesses. The tabs are coupled to the outer race. The inner and outer members are permitted to rotate relative to each other.

27 Claims, 9 Drawing Sheets

U.S. PATENT DOCUMENTS

| | | |
|---|---|---|
| 5,002,406 A | 3/1991 | Morton et al. |
| 5,042,822 A | 8/1991 | Dreschmann et al. |
| 5,147,139 A | 9/1992 | Lederman |
| 5,419,642 A | 5/1995 | McLarty |
| 5,685,650 A | 11/1997 | Martinie et al. |
| 5,704,719 A | 1/1998 | Cook et al. |
| 5,716,147 A | 2/1998 | Cook et al. |
| 5,863,137 A | 1/1999 | Johnson et al. |
| 5,927,864 A | 7/1999 | Feerick |
| 6,149,158 A | 11/2000 | Tripathy |
| 6,481,896 B1 | 11/2002 | Ohtsuki et al. |
| 6,497,514 B2 | 12/2002 | Maldera et al. |
| 6,581,939 B1 | 6/2003 | Theros et al. |
| 6,677,283 B2 | 1/2004 | Ni |
| 6,729,765 B2 | 5/2004 | Ni et al. |
| 6,746,018 B2 | 6/2004 | Lewis et al. |
| 6,817,769 B2 | 11/2004 | Johnson et al. |
| 6,840,679 B2 | 1/2005 | Lenick et al. |
| 6,854,893 B2 | 2/2005 | Schmidt |
| 6,887,520 B1 | 5/2005 | Paver et al. |
| 6,908,230 B2 | 6/2005 | Johnson et al. |
| 7,258,491 B2 | 8/2007 | Gutowski et al. |
| 2002/0022581 A1 | 2/2002 | Ni |
| 2003/0063824 A1 | 4/2003 | Aldridge |
| 2004/0120621 A9 | 6/2004 | Johnson et al. |

OTHER PUBLICATIONS

Second Office Action dated Apr. 6, 2011 from corresponding Chinese Patent Application No. 200780030138.4 (English translation, 12 pages).

International Search Report and Written Opinion dated Aug. 2, 2011 from corresponding International Patent Application No. PCT/US2010/056187 (6 pages).

\* cited by examiner

EXTERNAL BEARING SHROUD

CROSS-REFERENCE TO RELATED APPLICATIONS

This application is a continuation-in-part of U.S. patent application Ser. No. 11/480,212 filed on Jun. 30, 2006. The entire disclosure of the above application is incorporated herein by reference.

FIELD

The invention relates to a bearing assembly, and more specifically, to the sealing structures of bearing assemblies.

BACKGROUND

Various bearing assemblies are known in the art. Typical bearing assemblies include a circumferential inner race mounted on an inner component, for example, a rotating inner member such as a shaft, and an outer race positioned so that the inner race is in an opposed and spaced apart relation from the outer race. The outer race is mounted to an outer component, such as for example, a stationary member. A plurality of roller elements, such as balls, is typically disposed between the inner race and the outer race. The roller elements reduce friction and wear between the moving parts and surfaces, and the bearing assembly often contains a lubricant to further protect the roller elements and other parts by reducing friction and wear. Exemplary bearing assemblies are disclosed in U.S. Pat. No. 5,704,719 (Cook et al.), U.S. Pat. No. 5,716,147 (Cook et al.), U.S. Pat. No. 5,863,137 (Johnson et al.), U.S. Pat. No. 5,927,864 (Feerick), and U.S. Pat. No. 6,677,283 (Ni), all of which are incorporated herein by reference.

Bearing assemblies are often subjected to harsh operating environments where the bearing assemblies are exposed to liquid, gaseous, and solid contaminants. For example, bearing assemblies often encounter dirt, abrasive materials, metal particles, corrosive chemicals, and water. Contaminants that migrate into the bearing assembly interior can quickly cause damage and wear to the roller elements that can ultimately result in bearing failure. Accordingly, a need may exist for an improved robust bearing seal structure.

SUMMARY

A bearing assembly includes an inner race adapted to be coupled to an inner member and an outer race adapted to be coupled to an outer member positioned such that the inner race is in an opposed and spaced apart relation from the outer race. Roller elements are disposed between the inner and outer races. An inner flange is coupled to the outer race, includes circumferentially spaced apart recesses and extends generally radially toward the inner race. An outer flange is coupled to the inner race. A flexible sealing member contacts both the inner flange and the outer flange. A shroud includes tabs that extend through the recesses. The tabs are coupled to the outer race. The inner and outer members are permitted to rotate relative to each other.

In another arrangement, a bearing assembly includes an inner race adapted to be coupled to an inner member and an outer race including a substantially spherically-shaped roller contact surface. The outer race is adapted to be coupled to an outer member and positioned such that the inner race is in an opposed and spaced apart relation from the outer race. Roller elements are disposed between the inner race and the outer race and are in contact with the roller contact surface. An inner flange is coupled to the outer race, includes circumferentially spaced apart recesses and extends generally radially toward the inner race. An outer flange is coupled to the inner race. A flexible sealing member contacts a member coupled to the inner race and a member coupled to the outer race. A shroud includes tabs that extend through the recesses. The tabs are coupled to the outer race. The inner member and the outer member are permitted to rotate relative to each other along non-coincident axes.

In another embodiment, a bearing assembly includes an inner race adapted to be coupled to an inner member and an outer race adapted to be coupled to an outer member positioned such that the inner race is in an opposed and spaced apart relation from the outer race. Roller elements are disposed between the inner and outer races. An inner flange is coupled to the outer race, includes circumferentially spaced apart recesses and extends generally radially toward the inner race. An outer flange is coupled to the inner race. A shroud includes tabs that extend through the recesses. The tabs are coupled to the outer race. The outer flange overlaps the inner flange and the shroud overlaps the outer flange. The inner member and outer member are permitted to rotate relative to each other.

In another embodiment, a bearing assembly includes an inner race coupled to an inner member and an outer race coupled to an outer member. The outer race is positioned in an opposed and spaced apart relation from the inner race. Roller elements are disposed between the inner race and the outer race. A flange element is coupled to one of the inner race and the outer race and extends generally radially toward the other one of the inner race and the outer race. A metallic shroud is coupled to the other one of the inner race and the outer race and extends adjacent to the flange element. The inner member and the outer member are permitted to rotate relative to each other.

DRAWINGS

The drawings described herein are for illustration purposes only and are not intended to limit the scope of the present disclosure in any way.

DETAILED DESCRIPTION

Figure 1:
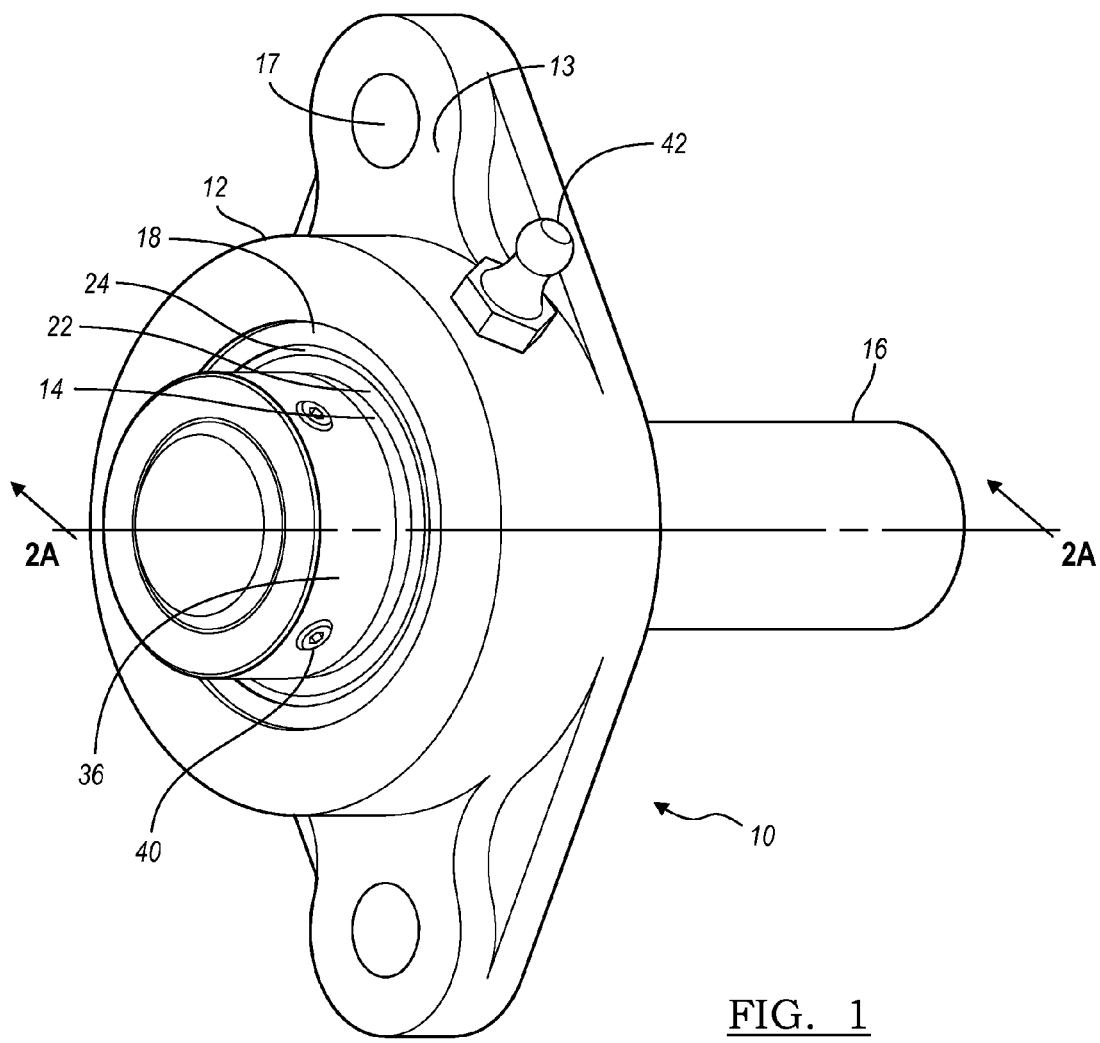
FIG. 1 is a perspective view of an embodiment of a bearing assembly and resilient seal element.

The following description is merely exemplary in nature and is not intended to limit the present disclosure, application, or uses. It should be understood that throughout the drawings, corresponding reference numerals indicate like or corresponding parts and features in the various embodiments, although the exact structural configurations of the features may be somewhat different. "A" and "an" as used herein indicate "at least one" of the item is present; a plurality of such items may be present, when possible.

Figure 2A:
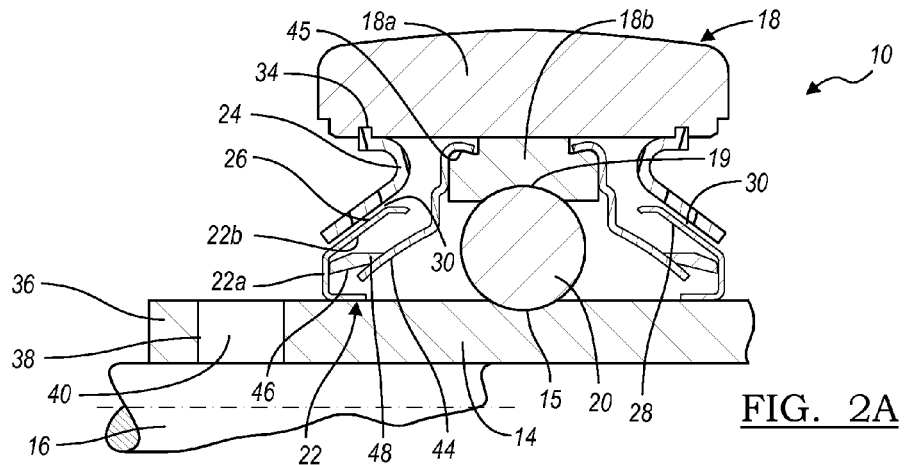
FIG. 2A is a fragmentary cross-sectional view of a bearing assembly and resilient seal element.

FIG. 1 and FIG. 2A illustrate an exemplary embodiment of a bearing assembly 10, including a resilient seal element 24, mounted on an inner member which can be a shaft 16, and retained within a housing 12. An outer member can be coupled to the bearing assembly 10, for example, by using bolts (not shown) through apertures 17 in flanges 13 of the housing 12. The bearing assembly 10 includes an inner race 14, which is mounted on the shaft 16, and an outer race 18 positioned such that a roller bearing surface 15 of the inner race 14 is in an opposed and spaced apart relation from a roller bearing surface 19 of the outer race 18. A plurality of roller elements 20 is disposed between the inner race 14 and the outer race 18. It will be appreciated that although the roller elements 20 are depicted as spherical balls in FIG. 2A, they can be any number of different types of roller elements 20, including for example, needle rollers, tapered rollers, and offset rollers. Furthermore, although only a single row of roller elements 20 is illustrated in this embodiment, there can be more than one row of roller elements 20 within the bearing assembly 10.

A rigid element, such as a flange element 22, is shown coupled directly to the inner race 14; the flange element 22 extends in a generally radial direction toward the outer race 18. Extending in this generally radial direction is a perpendicular portion 22a and an angled portion 22b. As illustrated in this embodiment, the outer race 18 (like the inner race 14) can be formed of multiple components, 18a and 18b, coupled together. A resilient seal element 24 is coupled to the outer race 18 and extends therefrom to lie adjacent to the outside 26 of flange element 22, as shown. In this embodiment, the flange element 22 and adjacent resilient seal element 24 are illustrated as being in close proximity to each other, resulting in a narrow gap 30 between the flange element 22 and resilient seal element 24, for example as shown in FIG. 2A. Alternatively, the resilient seal element 24 can contact the flange element 22, for example as shown in FIGS. 2B and 2C.

Figure 2B:
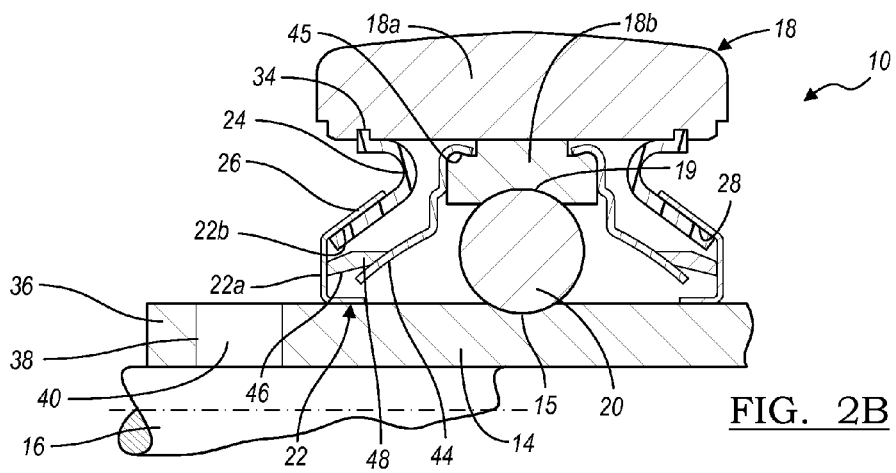
FIG. 2B is a fragmentary cross-sectional view of an alternate embodiment of a bearing assembly and resilient seal element.
Figure 2C:
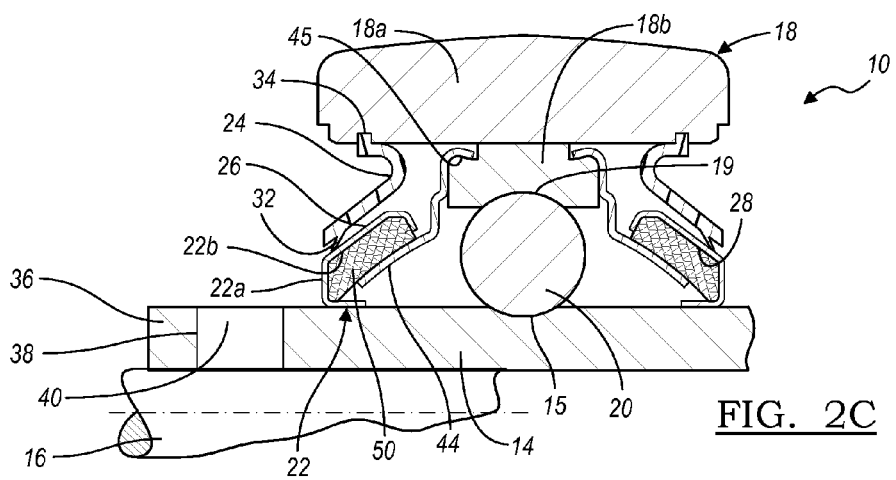
FIG. 2C is a fragmentary cross-sectional view of an alternate embodiment of a bearing assembly and resilient seal element.
Figure 3A:
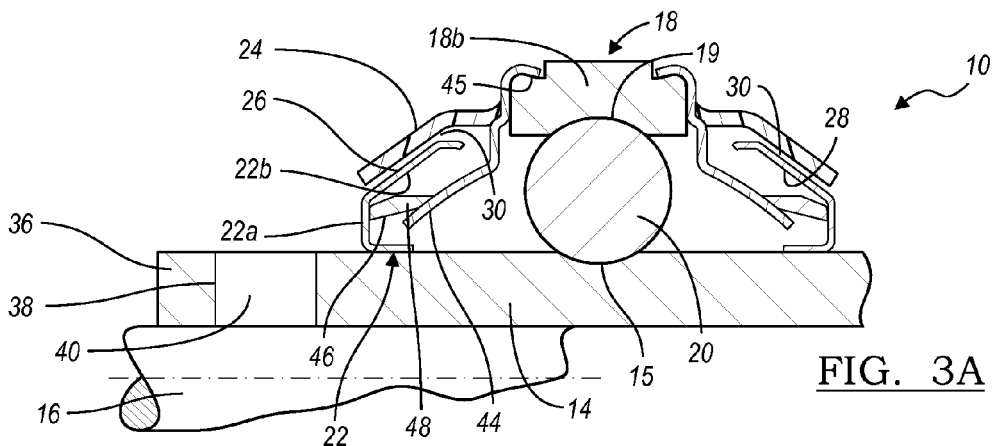
FIG. 3A is a fragmentary cross-sectional view of an alternate embodiment of a bearing assembly and resilient seal element.
Figure 3B:
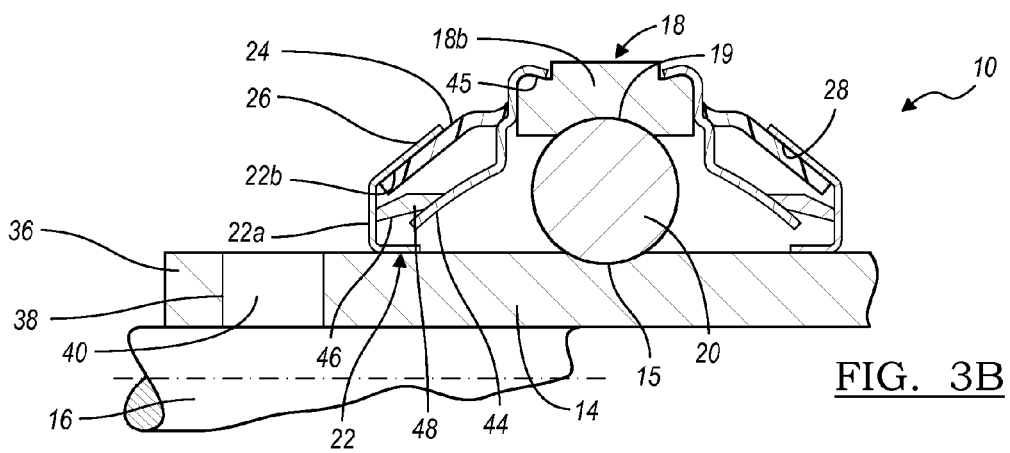
FIG. 3B is a fragmentary cross-sectional view of an alternate embodiment of a bearing assembly and resilient seal element.
Figure 3C:
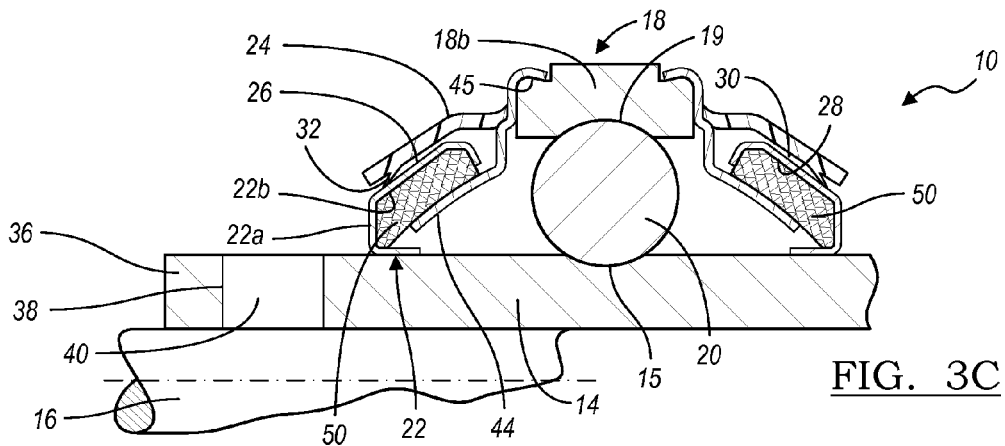
FIG. 3C is a fragmentary cross-sectional view of an alternate embodiment of a bearing assembly and resilient seal element.

The term "adjacent" in describing the relationship of the resilient seal element 24 to the flange element 22 includes embodiments having a narrow gap 30 between the resilient seal element 24 and the flange element 22 (examples include FIGS. 2A and 3A), embodiments where the resilient seal element 24 contacts the flange element 22 (examples include FIGS. 2B, 2C, 3B, and 3C), as well as embodiments where the resilient seal element 24 is outside 26 of the flange element (examples include FIGS. 2A, 2C, 3A, and 3C) or inside 28 of the flange element 22 (examples include FIGS. 2B and 3B). For instance, contact between the flange element 22 and adjacent resilient seal element 24 can be direct or via a molded lip seal 32 extending from the resilient seal element 24 as shown in FIGS. 2C and 3C. Other embodiments include bearing assemblies 10 where the resilient seal element 24 is adjacent to the flange element 22 along a substantial length of the resilient seal element 24, or where just the distal end of the resilient seal element 24 is adjacent to the flange element 22. In embodiments where the resilient seal element 24 contacts the flange element 22, the absence of a gap can create a zero clearance seal between the resilient seal element 24 and the flange element 22.

The resilient seal element 24 can be formed of various materials; typically the resilient seal element 24 can be made of polymer, rubber, or elastomeric material. Exemplary materials for the resilient seal element 24 include: nylon; polypropylene; fluoropolymer, such as TEFLON® from DuPont; fluoroelastomer, such as VITON®; nitrile; ethylene acrylic elastomer, such as VAMAC®; urethane; polyimide, such as VESPEL®; or other polymers, rubbers, elastomers, and composites thereof. Other exemplary materials, including materials amenable to ultrasonic welding, are: poly(acrylonitrile, butadiene, styrene), i.e., ABS copolymer; acrylic; butadiene-styrene; phenylene-oxide based resin; polycarbonate; polyetherimide; polyethersulfone; polystyrene; poly(vinyl chloride); acetal; cellulosic; fluoropolymer; nylon; polyester; polyetheretherketone (PEEK); polyethylene; polymethylpentene; polyphenylene sulfide; and polypropylene. Essentially any pliable material can be used as long as it is compatible with the expected operating environment of the bearing assembly 10; for example, it should be chemically and thermally stable relative to the intended application.

Wear characteristics of the material chosen for the resilient seal element 24 are also important. Typically, any contact between the resilient seal element 24 and the flange element 22 produces less wear for both the resilient seal element 24 and the flange element 22 compared to a seal element composed of a rigid material, such as metal. For example, contact between a metallic seal element and a metallic flange element 22 can quickly wear the metallic seal and metallic flange element 22 and can irreversibly damage the seal effectiveness. The pliability of the resilient seal element 24 allows it to bend if the flange element 22 contacts the resilient seal element 24. Also, the flexible and pliable character of the resilient seal element 24 allows it to accommodate movement between the resilient seal element 24 and flange element 22 while still maintaining an effective seal. In addition, the pliability of the resilient seal element 24 can allow the resilient seal element 24 to be biased against the flange element 22. Embodiments of the resilient seal element 24 can further include tapered shapes so that if the resilient seal element 24 is biased against the flange element 22, the resilient seal element 24 remains in contact with the flange element 22 as it wears.

As shown in the embodiments of FIGS. 2A-2C, the resilient seal element 24 is coupled to the outer race 18 by press-fitting into a receiving channel 34. However, the resilient seal element 24 can alternatively be coupled to the outer race 18 by various methods typically known in the art. Such coupling methods (not shown) include, but are not limited to, ultrasonic welding, adhesive bonding, or by melting the resilient seal element 24 into holes or notches formed in the outer race 18. It should be recognized that the coupling method and the choice of material for the resilient seal element 24 can be interdependent. For example, it is recognized that a polymeric resilient seal element 24 should be compatible with an adhesive used to couple the resilient seal element 24 to the outer race 18.

The bearing assembly 10 may be attached to the inner member, which can be a shaft 16, using any suitable method. One exemplary method is shown in the Figures, where the inner race 14 has an axial extension 36 with a threaded aperture 38 to receive a setscrew 40. A setscrew 40 is tightened down against the shaft 16 to secure the inner race 14 and bearing assembly 10 to the shaft 16. More than one axial extension 36 and/or setscrew 40 can be used, for example. Other attachment devices can be used to couple the shaft 16 to the bearing assembly 10, such as for example, compressible annular locking collars as described in U.S. Pat. Nos. 5,863, 137 and 6,908,230, which are incorporated herein by reference in their entirety.

Lubrication of the bearing assembly 10 and resilient seal element 24 can be accomplished via a grease fitting 42. The grease fitting 42 directs grease or other lubricant through the outer race 18 to lubricate the roller elements 20. The resilient seal element 24 can help retain the grease or lubricant within the bearing assembly 10, in addition to excluding entry of outside contaminants. Moreover, any space between the flange element 22 and adjacent resilient seal element 24, such as a narrow gap 30, will tend to fill with and retain grease or lubricant upon lubrication of the bearing assembly 10.

The bearing assembly 10 and resilient seal element 24 can further include another rigid element, such as a seal carrier 44, and a cooperating flexible sealing member 46. The seal carrier 44 is shown in FIG. 2A as coupled to the outer race 18 and extending generally radially toward the inner race 14. The seal carrier 44 can be formed of metal. A flexible sealing member 46 can be coupled to the inner race 14 via the flange element 22. The flexible sealing member 46 has at least one sealing leg 48 sealingly contacting the seal carrier 44. The flexible sealing member 46 can function similar to a one-way valve which permits lubricant to move outward but limits movement of lubricant and contaminants into the bearing assembly. Alternatively (not shown), the flexible sealing member 46 can be coupled to the outer race 18 (for example, via the seal carrier 44) and sealingly contact the flange element 22 with at least one sealing leg 48. The flexible sealing member 46 can be made of materials similar to those discussed above regarding the resilient seal element 24.

The seal carrier 44 can be coupled to the outer race 18, as shown in FIGS. 2A-3C, by snap-fitting the seal carrier 44 over an inwardly angled lip 45. As illustrated in the drawings, a snap-fit is provided by including an angled end portion on the seal carrier 44 that cooperates with the inwardly angled lip 45. Thus, a component of the outer race 18b can be constructed to provide clearance for the edge of the seal carrier 44 as the seal carrier 44 is pressed over the outer race 18b and snaps into the inwardly angled lip 45 on the outer race 18b. Coupling the seal carrier 44 to the outer race 18b by snap-fitting provides a radial press fit and an axial force that pulls the seal carrier 44 against the outer race 18b, holding the seal carrier 44 in place. Of course, many alternative snap-fit arrangements could be provided as would be apparent to one skilled in the art.

Other non-limiting examples (not shown) include a bearing assembly 10 with an inner race 14, an outer race 18, a plurality of roller elements 20, and a seal assembly, where the inner race 14 and outer race 18 rotate relative to each other. The inner race 14 is coupled to an inner member and the outer race 18 is coupled to an outer member, with the races 14, 18 positioned such that the inner race 14 is in an opposed and spaced apart relation from the outer race 18. The plurality of roller elements 20 is disposed between the inner 14 and outer races 18. The seal assembly includes a first rigid element and a resilient seal element 24. The first rigid element includes a snap-fit member coupling the first rigid element to either the inner 14 or outer race 18 so that the first rigid element extends generally radially toward the other one of the inner 14 or outer race 18. The resilient seal element 24 is coupled to the other one of the inner race 14 and the outer race 18 and extends adjacent to the first rigid element. The bearing assembly 10 can further include a second rigid element and the second rigid element can be coupled to the other one of the inner race 14 and the outer race 18 by snap-fitting, for example. The resilient seal element 24 can also be coupled to the other one of the inner race 14 and the outer race 18 by the second rigid element.

An alternative embodiment, shown in FIG. 2B, is substantially identical to the bearing assembly 10 of FIG. 2A, except that the flange element 22 does not bend at its distal end, and the resilient seal element 24 extends from the outer race 18 to lie adjacent to the inside 28 of the flange element 22.

In another alternate embodiment, shown in FIG. 2C, the resilient seal element 24 can contact an outer surface of the flange element 22, providing essentially no gap, or a zero clearance seal, between the resilient seal element 24 and the flange element 22. Contact can be provided by one or more molded lip seals 32 extending from the resilient seal element 24 to contact the flange element 22. One or more molded lip seals 32 can help exclude outside contaminants from entering the bearing assembly 10 and can further help retain grease or lubricant between the resilient seal element 24 and the flange element 22. Moreover, the flexible sealing member 46 can be in the form of a felt insert 50 disposed between the seal carrier 44 and the flange element 22. The felt insert can help exclude entry of contaminants and loss of lubricant, in addition to the benefits afforded by the resilient seal element 24.

Other embodiments of a bearing assembly 10 and resilient seal element 24 are shown in FIGS. 3A-C. These embodiments use the seal carrier 44 to couple the resilient seal element 24 to the outer race 18. For example, as illustrated in FIG. 3A, the resilient seal element 24 is coupled the outer race 18. This is accomplished by coupling the resilient seal element 24 directly to the seal carrier 44 which is in turn coupled directly to the outer race 18.

The resilient seal element 24 can be coupled directly to the seal carrier 44 by various methods typically known in the art. Such coupling methods include, but are not limited to, press-fitting into a receiving channel (not shown) in the seal carrier 44, ultrasonic welding, adhesive bonding, or by melting the resilient seal element 24 into holes or notches (not shown) formed in the seal carrier 44.

As shown in FIG. 3A, the resilient seal element 24 extends adjacent to the outside 26 of the flange element 22. The resilient seal element 24 forms a gap 30 with the flange element 22. FIG. 3B shows an embodiment where the resilient seal element 24 is coupled to the seal carrier 44 and extends adjacent to the inside 28 of the flange element 22, and as illustrated, directly contacts the flange element 22. Additional sealing features, such as a flexible sealing member 46 (an exemplary embodiment is shown in FIG. 3B) or a felt insert 50 (an exemplary embodiment is shown in FIG. 3C), can be included in the bearing assembly 10. FIG. 3C illustrates an embodiment where the resilient seal element 24 is coupled to the outer race 18 via the seal carrier 44, and where the resilient seal element 24 contacts the flange element 22 via a molded lip seal 32.

Figure 4:
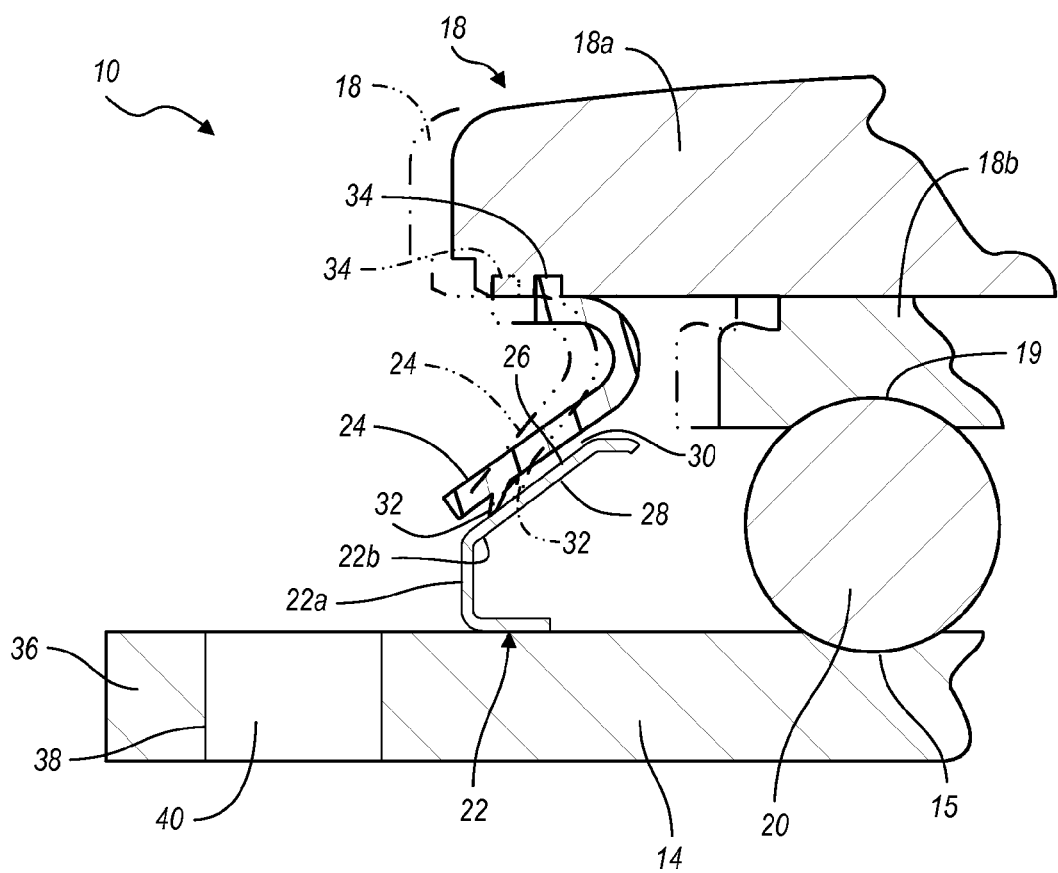
FIG. 4 is a fragmentary cross-sectional view of an alternate embodiment of a bearing assembly and resilient seal element with axial movement of bearing assembly components shown in phantom.

FIG. 4 illustrates movement of a flange element 22 and a resilient seal element 24 relative to each other. Movement can be due to thermal expansion of the entire bearing assembly 10 or thermal expansion of various components of the bearing assembly 10. Likewise, movement can be due to wear of components of the bearing assembly 10. Movement within the bearing assembly 10 can be radial and/or axial; an example of axial movement is depicted in FIG. 4. The flange element 22 is shown coupled to an inner race 14 and the resilient seal element 24 is coupled to the outer race 18 by press-fitting to a receiving channel 34. In the depicted embodiment, the resilient seal element 24 is biased against the flange element 22. As the inner race 14 and outer race 18 move radially with respect to each other, the resilient seal element 24, which is biased against the flange element 22, moves and/or slides along the flange element 22, but maintains contact or a narrow gap 30 with the flange element 22 due to the pliable character of the resilient seal element 24. Consequently, the resilient seal element 24 can maintain an effective seal with the flange element 22 as the bearing assembly 10 expands and/or moves as a result of temperature changes and/or wear.

Alternate embodiments (not shown) can include a bearing assembly 10 and resilient seal element 24 where the location of the flange element 22 and resilient seal element 24 are reversed relative to the inner race 14 and outer race 18. For example, a flange element 22 can alternatively be coupled to the outer race 18 of the bearing assembly 10, whereupon the flange element 22 would extend generally in a radial direction toward the inner race 14. Accordingly, the resilient seal element 24 would be coupled to the inner race 14 and would extend generally radially towards the outer race 18 to lie adjacent to the flange element 22. Alternate embodiments also include where the flange element 22 is coupled to the outer race 18 and the seal carrier 44 is coupled to the inner race 14. In these embodiments, the resilient seal element 24 is coupled to the seal carrier 44 and would extend generally radially towards the outer race 18 to lie adjacent to the flange element 22.

Figure 5:
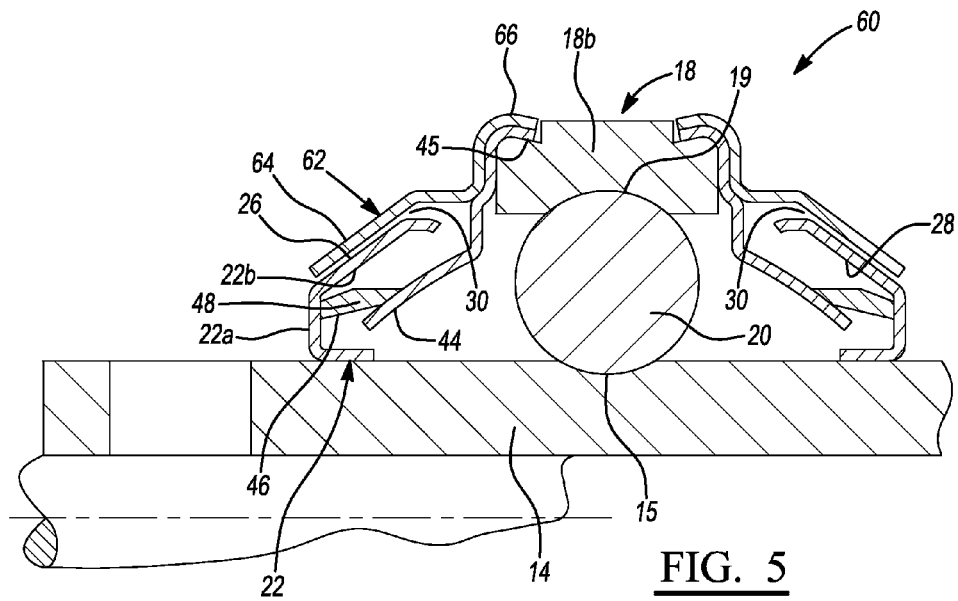
FIG. 5 is a fragmentary cross-sectional view of a bearing assembly and metallic shroud.
Figure 6:
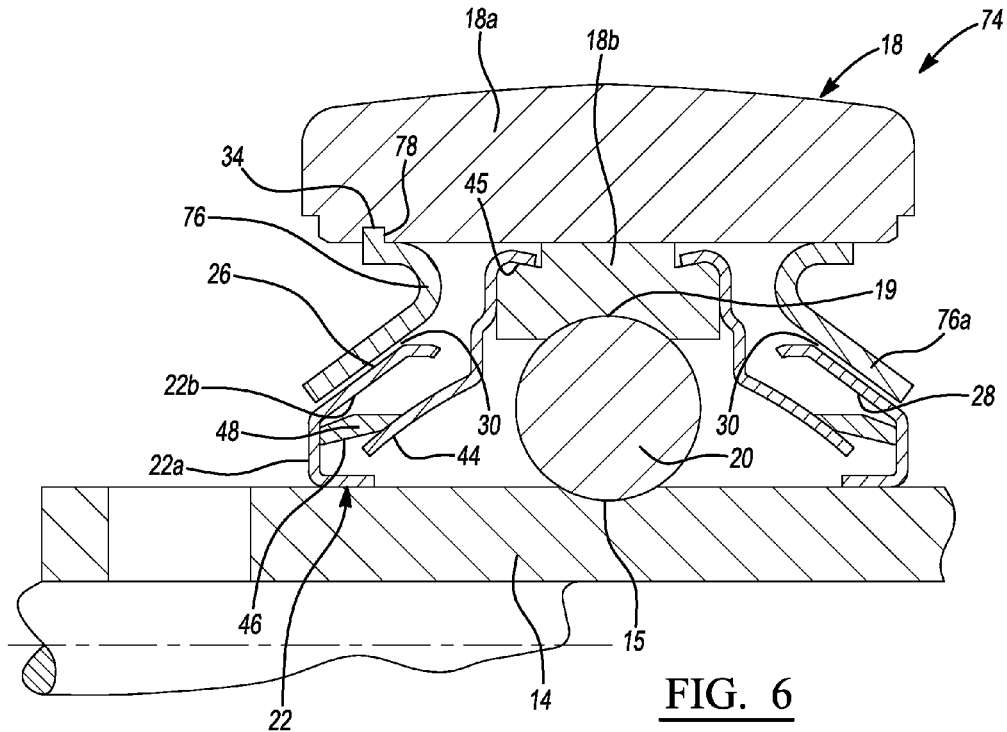
FIG. 6 is a fragmentary cross-sectional view of an alternate embodiment of a bearing assembly and metallic shroud.
Figure 7:
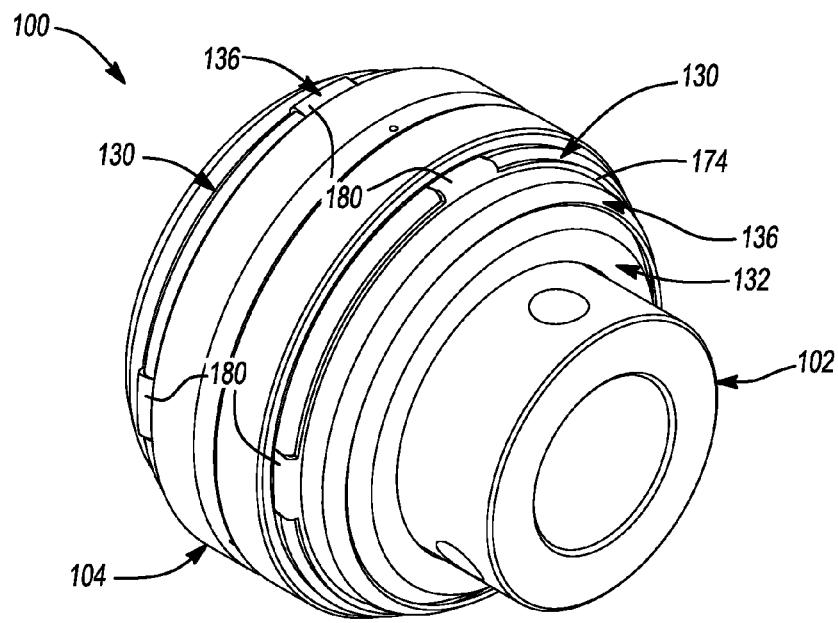
FIG. 7 is a perspective view of an alternate bearing assembly.
Figure 8:
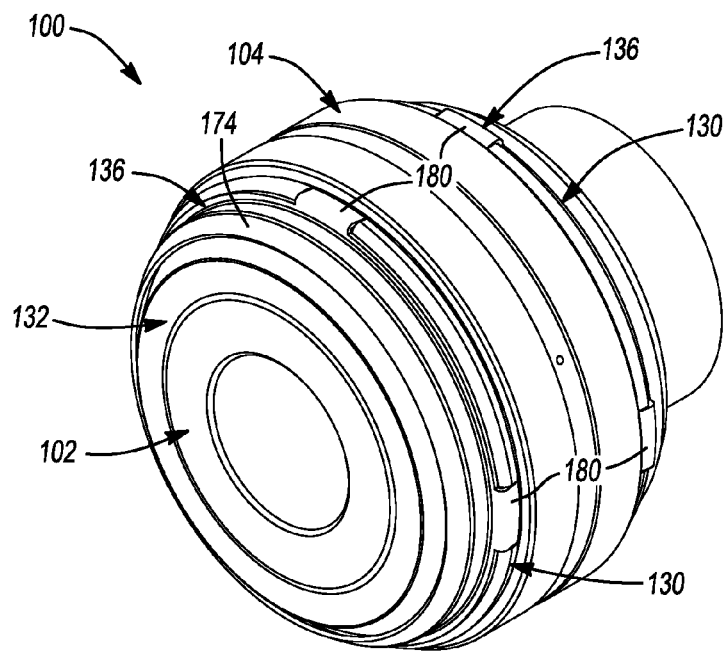
FIG. 8 is an opposite perspective view of the bearing assembly depicted in FIG. 7.
Figure 9:
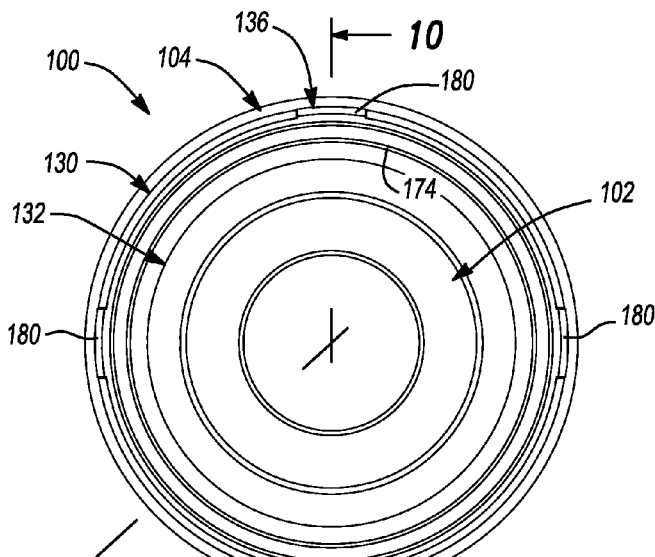
FIG. 9 is an end view of the alternate bearing assembly.

FIGS. 5 and 6 illustrate alternate bearing assemblies for use with components such as shaft 16 and housing 12. The alternate bearing assemblies include a metallic shroud in lieu of resilient seal element 24, previously described. A rigid metallic shroud may provide additional protection from outside contaminants. Some working environments are particularly harsh where falling particulates and abrasive particles may be present. A metallic shroud may also provide a robust design where superior impact strength is desired. Furthermore, metals typically provide superior wear resistance when compared to various polymeric materials. A metallic shroud may also be less susceptible to warping or other dimensional variation when compared to a polymeric material. Components formed from metal may be shaped within a more narrow tolerance band at a relatively economical tooling cost. The material properties of metals allow alternate attachment methods including a press-fit. A residual stress within the metal may be maintained within an elastic deformation region while polymeric materials are generally subject to creep and compression set.

FIG. 5 depicts an alternate bearing assembly 60. Bearing assembly 60 is substantially similar to bearing 10 depicted in FIG. 3A. Accordingly, like elements will be identified by their previously introduced reference numerals. Bearing assembly 60 differs from the arrangement depicted in FIG. 3A in that resilient seal element 24 is replaced by a metallic shroud 62 that is coupled to seal carrier 44. Metallic shroud 62 includes a substantially conically-shaped portion 64 overlapping outside 26 of flange element 22. Gap 30 extends between shroud 62 and flange element 22. Gap 30 may be maintained throughout bearing operation due to shroud 62 being mounted to outer race 18b.

Shroud 62 also includes a substantially axially extending flange portion 66 press-fit to seal carrier 44. Alternate attachment methods such as welding, adhesive bonding, riveting, staking, crimping, and others are contemplated as being within the scope of the present disclosure. By positioning shroud 62 as depicted in FIG. 5, the volume of space defined by gap 30 may retain lubricant, if desired. Gaps between seal carrier 44, inner race 14, flange element 22 and shroud 62 may be packed with lubricant to further resist contaminant ingress. Furthermore, it should be appreciated that while shroud 62 is depicted in use with flexible sealing member 46, any number of other sealing arrangements may be protected with shroud 62. In one version, flexible sealing member 46 is not present. Ingress of contamination is limited by the labyrinth path formed by shroud 62 and flange element 22.

Other variations of bearing 60 are also contemplated. In particular, another arrangement may include a metallic shroud 62 having an elastomeric flexible seal leg similar to element 22b shown in FIG. 3C. The flexible seal leg sealingly engages flange element 22. The flexible seal leg may be coupled to either shroud 62 or flange element 22.

FIG. 6 depicts another alternate bearing assembly identified at reference numeral 74. Bearing 74 is substantially similar to bearing 10 depicted in FIG. 2A. Accordingly, like elements will be identified by their previously introduced reference numerals. Bearing assembly 74 includes a metal shroud 76 instead of resilient seal element 24. Depending on the particular design desired, channel 34 may or may not be present. If channel 34 is provided, shroud 76 may include a radially outwardly extending tab 78 positioned within channel 34. In an alternate arrangement shown on the right side of FIG. 6, a shroud 76a does not include tab 78. Metallic shroud 76a is press-fit to outer race 18a.

Other variations of bearing 74 are also contemplated. In particular, another arrangement may include a metallic shroud 76 having an elastomeric flexible seal leg similar to element 22b shown in FIG. 2C. The flexible seal leg sealingly engages flange element 22.

FIGS. 7-12 illustrate an alternate bearing assembly 100 including an inner race 102 and an outer race 104 positioned such that a first bearing surface 106 and a second bearing surface 108 formed in inner race 102 are in opposed and spaced apart relation from a roller bearing surface 110 of outer race 104. A first plurality of roller elements 112 are retained in a circumferentially spaced apart manner by a first cage 114. In similar fashion, a second plurality of roller elements 116 are retained by a second cage 118. Roller elements 112, 116 are depicted as elongated barrel shaped members. As previously mentioned, other types of roller elements are contemplated as being within the scope of the present disclosure.

A first seal and shroud combination 120 is associated with a first side 122 of outer race 104. A second seal and shroud combination 124 is associated with a second opposite side 126 of outer race 104. First seal and shroud combination 120 is substantially similar to second seal and shroud combination 124. Accordingly, only first seal and shroud combination 120 will be described in detail.

First seal and shroud combination 120 includes an inner flange 130, an outer flange 132, a seal 134 and a shroud 136. Inner flange 130 includes a substantially conically shaped portion 137, a radially outwardly extending flange portion 138, and an interrupted lip portion 140. As most clearly depicted in FIG. 11, a plurality of circumferentially spaced apart recesses 142 extend through lip portion 140 and partially extend through flange portion 138. Inner flange 130 may be formed from a low carbon steel, aluminum or another metallic material.

Figure 10:
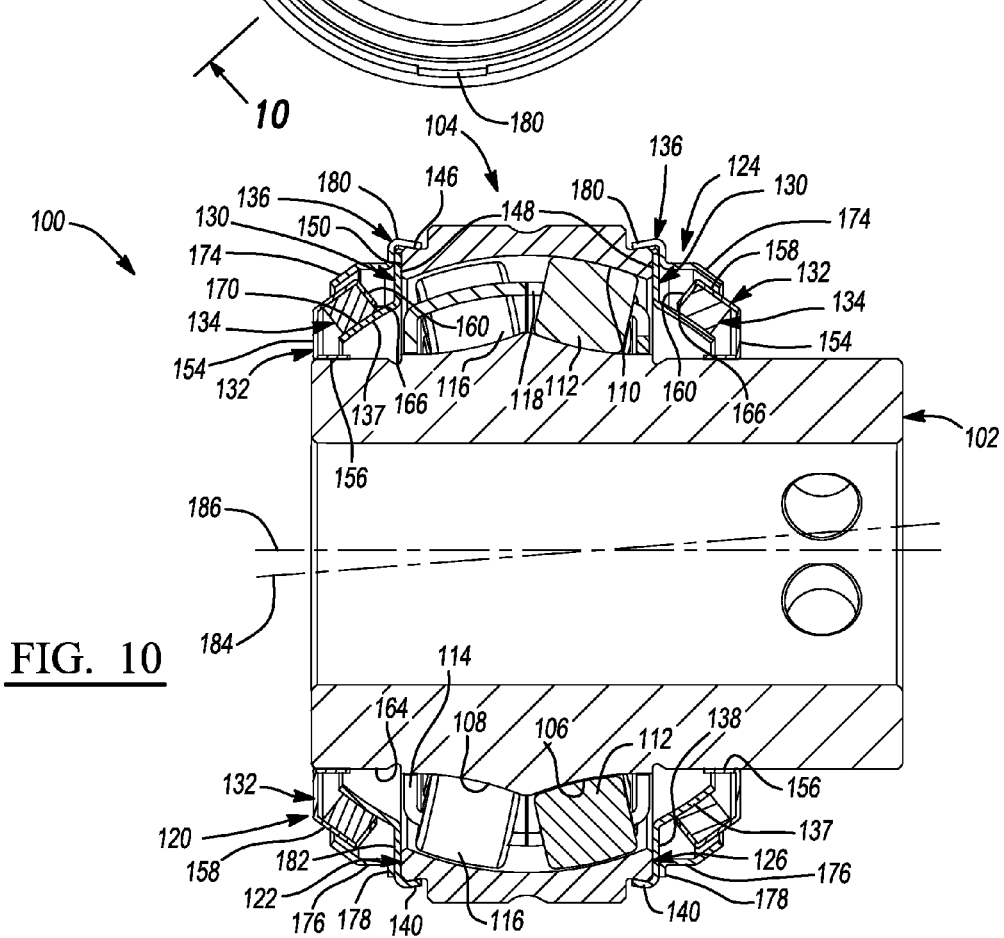
FIG. 10 is a cross-sectional view taken along lines 10-10 shown in FIG. 9.
Figure 11:
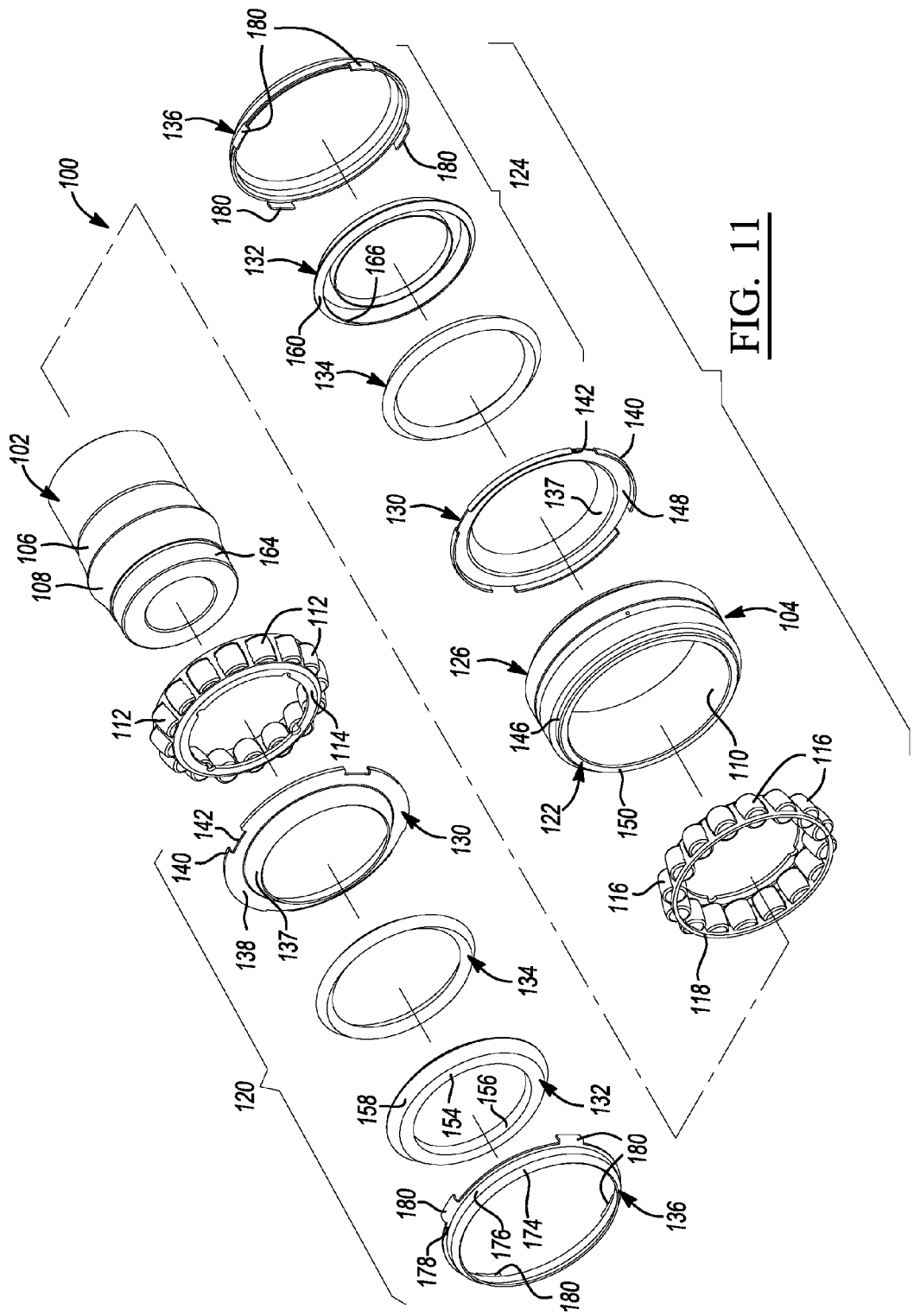
FIG. 11 is an exploded perspective view of the alternate bearing assembly.

Inner flange 130 is coupled to outer race 104 once the first plurality of rollers elements 112 and the second plurality of roller elements 116 have been positioned in communication with inner race bearing surfaces 106, 108 as well as outer race bearing surface 110. More particularly, an axial installation force is applied to inner flange 130 to press-fit lip portion 140 to an outer substantially cylindrical surface 146 positioned proximate first side 122. The force continues to be applied to inner flange 130 until a first surface 148 of flange portion 138 engages a first end face 150 of outer race 104. It should be appreciated that surface 146 may be formed as a right cylindrical surface or may alternatively include a conical shape, as shown in FIG. 10, to assist in retaining inner flange 130 and shroud 136 to outer race 104.

Outer flange 132 includes an annular body portion 154, a substantially cylindrical sleeve portion 156, a conical portion 158 and a retaining lip 160. Inner sleeve portion 156 is sized to engage a cylindrical portion 164 of inner race 102 in a press-fit arrangement. As best shown in FIG. 10, outer flange 132 is axially positioned to overlap inner flange 130 while maintaining a clearance between retaining lip 160 and substantially conical portion 137 of inner flange 130. Outer flange 132 may be formed from a low carbon steel, aluminum or another metal.

Figure 12:
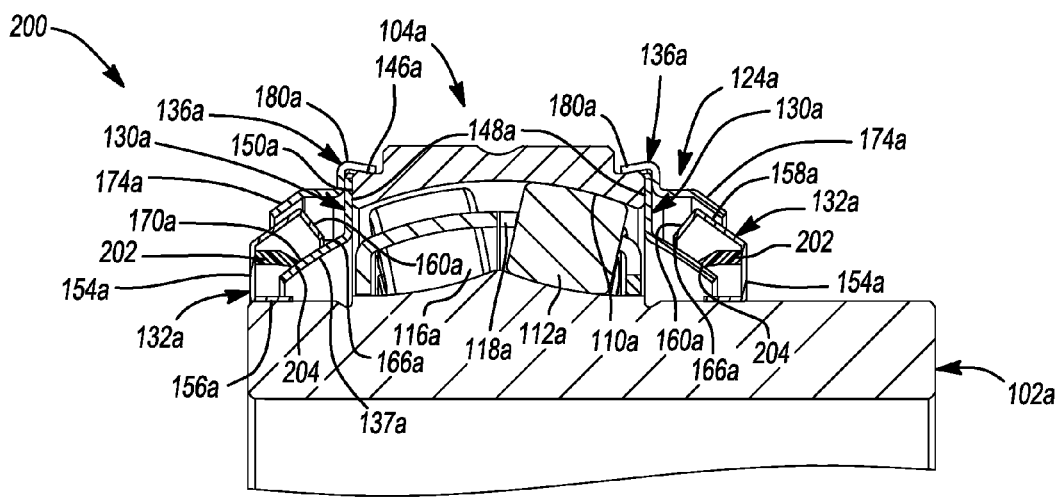
FIG. 12 is a fragmentary sectional view of another alternate bearing assembly.

Seal 134 is fixed to outer flange 132 and is sized to protrude beyond a distal end 166 of retaining lip 160 to sealingly engage an outer surface 170 of substantially conically shaped portion 137. As previously mentioned in relation to the embodiments depicted in FIGS. 2A, 2B and 2C, seal 134 may include felt. Foam or another elastomeric material may otherwise be used. Alternatively, element 134 may be shaped as a flexible sealing member 202 similar to flexible sealing member 46 having at least one sealing leg sealingly contacting inner flange 130, as shown in FIG. 12 and later described. In another alternate arrangement, seal 134 may be eliminated entirely. In this arrangement, it is contemplated that a lubricant such as a bearing grease would be positioned between inner flange 130 and inner race 102, between outer flange 132 and inner flange 130, and within gaps formed between inner flange 130, outer flange 132 and shroud 136. Grease may be purged through the labyrinth path defined by these components as well. In yet another version, the spaces between inner flange 130, outer flange 132 and shroud 136 may be void of lubricant or only partially filled with lubricant. The labyrinth path will continue to resist ingress of contamination due to the overlapping nature of the various components.

Shroud 136 includes a substantially conically shaped portion 174, a cylindrically shaped portion 176, a radially extending flange portion 178 and a plurality of axially extending tabs 180. Tabs 180 are circumferentially spaced apart from one another and sized to fit within recesses 142 of inner flange 130. Tabs 180 are further sized to engage outer cylindrical surface 146 of outer race 104 with an interference fit. Tabs 180 extend through recesses 142 to fix shroud 136 directly to outer race 104. Shroud 136 may include steel, aluminum or another metallic material.

Once shroud 136 is completely installed, radially extending flange portion 178 engages a second face 182 of flange portion 138. Conical portion 174 overlaps conical portion 158 of outer flange 132. A minimal clearance is maintained between shroud 136 and outer flange 132 to minimize the size of a contaminant intrusion path while allowing uninhibited relative rotation between inner race 102 and outer race 104. The clearance between shroud 136 and outer flange 132 as well as the clearance between inner flange 130 and inner race 102 allows for relative axial misalignment between an outer race axis of rotation 184 and an inner race axis of rotation 186 without interference between the relatively rotating components.

FIG. 12 depicts another alternate bearing assembly identified at reference numeral 200. Bearing assembly 200 is substantially similar to bearing assembly 100. Accordingly, like elements will retain their previously introduced reference numerals including an "a" suffix. In particular, bearing assembly 200 includes a flexible sealing member 202 coupled to outer flange 132a. Flexible sealing member 202 includes at least one sealing leg 204 arranged in a cantilevered manner to sealingly contact substantially conically shaped portion 137a of inner flange 130a. Flexible sealing member 202 may function as a one-way valve permitting lubricant to move away from roller elements 112a but restricting movement of lubricant and contaminants toward roller elements 112a. Alternatively, flexible sealing member 202 may be fixed to inner flange 130a and sealingly contact outer flange 132a. It is contemplated that flexible sealing member 202 may be made from any number of resilient materials including those described in relation to resilient seal element 24.

Alternate embodiments (not shown) can include a bearing assembly and shroud (62, 76, 136) where the location of the flange element 22 and shroud are reversed relative to the inner race 14 and outer race 18. For example, a flange element 22 can alternatively be coupled to the outer race 18 of the bearing assembly 10, whereupon the flange element 22 would extend generally in a radial direction toward the inner race 14. Accordingly, the shroud would be coupled to the inner race 14 and would extend generally radially towards the outer race 18 to lie adjacent to the flange element 22. Alternate embodiments also include where the flange element 22 is coupled to the outer race 18 and the seal carrier 44 is coupled to the inner race 14. In these embodiments, the shroud is coupled to the seal carrier 44 and would extend generally radially towards the outer race 18 to lie adjacent to the flange element 22.

Similarly, additional embodiments of bearing assembly 10, resilient seal element 24, bearing assembly 100 and bearing assembly 200 can further incorporate other structures, auxiliary seals, and end caps that are commonly used in bearing assemblies. For example, such structures include a face seal as described in U.S. Pat. No. 5,704,719 or an end cap as described in U.S. Pat. No. 6,581,939, which are hereby incorporated by reference. In the spherical roller bearing arrangements previously described, the spatial orientation and spacing between the shroud and the outer flange is maintained at a specific distance. The shroud provides contaminant protection during angular misalignment of the outer race relative to the inner race. Furthermore, relative axial movement may occur between an outer member such as 18a (FIG. 6) and outer race 18b. The predetermined spatial relationship between the shroud and the outer flange is maintained in the design variations depicted in FIGS. 5 and 7-12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bearing assembly comprising:
an inner race adapted to be coupled to an inner member;
an outer race adapted to be coupled to an outer member and positioned such that the inner race is in an opposed and spaced apart relation from the outer race;
roller elements disposed between the inner race and the outer race;
an inner flange being coupled to the outer race, including circumferentially spaced apart recesses, and extending generally radially toward the inner race;
an outer flange coupled to the inner race;
a flexible sealing member contacting both the inner flange and the outer flange; and
a shroud including tabs extending through the recesses, the tabs being coupled to the outer race, wherein the inner member and the outer member are permitted to rotate relative to each other.

2. The bearing assembly of claim 1, wherein the inner flange and the shroud are coupled to the outer race by press-fitting.

3. The bearing assembly of claim 1, wherein the outer flange overlaps the inner flange and the shroud overlaps the outer flange.

4. The bearing assembly of claim 1, wherein the flexible sealing member includes felt.

5. The bearing assembly of claim 1, wherein the roller elements are circumferentially spaced apart and retained in a first cage.

6. The bearing assembly of claim 5 further including additional roller elements circumferentially spaced apart and retained in a second cage, the additional roller elements being axially spaced apart from the roller elements and disposed between the inner and outer races.

7. The bearing assembly of claim 1, wherein the outer flange is coupled to the inner race by press-fitting.

8. The bearing assembly of claim 1, wherein the inner flange includes a radially extending flange portion engaging an end face of the outer race.

9. The bearing assembly of claim 1, wherein the outer race includes a spherically shaped surface in engagement with the rollers to allow the outer race to rotate about an axis that is not coincident with an inner race axis.

10. The bearing assembly of claim 1, wherein the shroud includes a metallic material.

11. The bearing assembly of claim 1, wherein the flexible sealing member includes a cantilevered sealing leg sealingly contacting the inner flange.

12. A bearing assembly comprising:
an inner race adapted to be coupled to an inner member;
an outer race including a substantially spherically-shaped roller contact surface, the outer race being adapted to be coupled to an outer member and positioned such that the inner race is in an opposed and spaced apart relation from the outer race;
roller elements in contact with the roller contact surface and being disposed between the inner race and the outer race;
an inner flange being coupled to the outer race, including circumferentially spaced apart recesses, and extending generally radially toward the inner race;
an outer flange coupled to the inner race;
a flexible sealing member contacting a member coupled to the inner race and a member coupled to the outer race; and
a shroud including tabs extending through the recesses, the tabs being coupled to the outer race, wherein the inner member and the outer member are permitted to rotate relative to each other along non-coincident axes.

13. The bearing assembly of claim 12 wherein the outer flange overlaps the inner flange and the shroud overlaps the outer flange.

14. The bearing assembly of claim 13, wherein the shroud overlaps the inner flange.

15. The bearing assembly of claim 12 wherein the flexible sealing member includes felt.

16. The bearing assembly of claim 12, wherein the inner flange includes a radially extending flange portion engaging an end face of the outer race.

17. The bearing assembly of claim 12, wherein the shroud includes a metallic material.

18. The bearing assembly of claim 12, wherein the flexible sealing member includes a cantilevered sealing leg sealingly contacting the inner flange.

19. A bearing assembly comprising:
an inner race adapted to be coupled to an inner member;
an outer race adapted to be coupled to an outer member and positioned such that the inner race is in an opposed and spaced apart relation from the outer race;
roller elements disposed between the inner race and the outer race;
an inner flange being coupled to the outer race, including circumferentially spaced apart recesses, and extending toward the inner race;
an outer flange coupled to the inner race; and
a shroud including tabs extending through the recesses, the tabs being coupled to the outer race, wherein the outer flange overlaps the inner flange, the shroud overlaps the outer flange and the inner and outer members are permitted to rotate relative to each other.

20. The bearing assembly of claim 19, wherein the inner flange and the shroud are coupled to the outer race by press-fitting.

21. The bearing assembly of claim 20, wherein the roller elements are circumferentially spaced apart and retained in a first cage.

22. The bearing assembly of claim 21 further including additional roller elements circumferentially spaced apart and retained in a second cage, the additional roller elements being axially spaced apart from the roller elements and disposed between the inner and outer races.

23. The bearing assembly of claim 22, wherein the outer flange is coupled to the inner race by press-fitting.

24. The bearing assembly of claim 23, wherein the inner flange includes a radially extending flange portion engaging an end face of the outer race.

25. The bearing assembly of claim 24, wherein the outer race includes a spherically shaped surface in engagement with the rollers to allow the outer race to rotate about an axis that is not coincident with an inner race axis.

26. A bearing assembly comprising:
an inner race coupled to an inner member;
an outer race coupled to an outer member and positioned such that the inner race is in an opposed and spaced apart relation from the outer race;
a plurality of roller elements disposed between the inner race and the outer race;
a flange element coupled to one of the inner race and the outer race, the flange element extending generally radially toward the other one of the inner race and the outer race;
a flexible sealing member contacting a member coupled to the inner race and a member coupled to the outer race; and
a metallic shroud separate from the flexible sealing member and spaced apart therefrom, the metallic shroud being coupled to the other one of the inner race and the outer race, the shroud extending adjacent to the flange element and spaced apart a distance to prevent contact therebetween to permit uninhibited relative rotation between the inner race and the outer race;
wherein the inner member and the outer member are permitted to rotate relative to each other.

27. The bearing assembly of claim 26, wherein the shroud is coupled to the other one of the inner race and the outer race by press-fitting.

* * * * *